United States Patent [19]

Stacy

[11] 4,377,729
[45] Mar. 22, 1983

[54] APPARATUS FOR ELIMINATING PICTURE BOUNCE IN TELEVISION/TELEPHONE SYSTEM

[75] Inventor: Carl W. Stacy, Elmwood Park, Ill.

[73] Assignee: Zenith Radio Corporation, Glenview, Ill.

[21] Appl. No.: 281,458

[22] Filed: Jul. 8, 1981

[51] Int. Cl.³ .................... H04M 11/08; H04N 7/14
[52] U.S. Cl. ................... 179/2 TV; 358/85; 179/1 HS
[58] Field of Search ............. 179/1 HF, 1 HS, 2 TV, 179/90 B; 358/85; 361/169

[56] References Cited

U.S. PATENT DOCUMENTS

| | | | |
|---|---|---|---|
| 3,601,540 | 8/1971 | Bryan | 179/90 B X |
| 4,008,380 | 2/1977 | La Borde | 179/90 B |
| 4,150,254 | 4/1979 | Schussler et al. | 179/2 TV |
| 4,338,492 | 7/1982 | Snopko | 358/85 X |
| 4,356,509 | 10/1982 | Skerlos et al. | 179/2 TV X |

Primary Examiner—G. Z. Rubinson
Assistant Examiner—Keith E. George
Attorney, Agent, or Firm—Jack Kail

[57] ABSTRACT

A television receiver includes a video display for producing a video display image in accordance with a received television signal and a power supply responsive to an irregular current drain for perturbating the video display image. A telephone interface circuit coupled to the power supply is responsive to a viewer initiated dialing signal for completing a telephone connection with the corresponding telephone number in a manner so as to cause an irregular current drain from the power supply. The resulting perturbations otherwise present in the video display image are eliminated by a circuit cooperating with the telephone interface circuit for effecting a substantially uniform current drain from the power supply in response to the dialing signal.

10 Claims, 4 Drawing Figures

APPARATUS FOR ELIMINATING PICTURE BOUNCE IN TELEVISION/TELEPHONE SYSTEM

BACKGROUND OF THE INVENTION

The present invention relates generally to a system for placing and receiving telephone calls through a television receiver, and more particularly relates to a circuit for eliminating perturbations such as picture bounce and jitter when dialing a selected telephone number through the television receiver.

U.S. patent application Ser. No. 109,424, now U.S. Pat. No. 4,338,492, filed Jan. 2, 1980 in the name of Paul Snopko and assigned to the assignee of the present invention, discloses a system for receiving and answering in-coming telephone calls through a television receiver. U.S. patent application Ser. No. 243,010, now U.S. Pat. No. 4,356,509, filed Mar. 12, 1981 in the names of Peter Skerlos, Paul Snopko, Frank Templin and Thomas Zato and also assigned to the assignee of the present invention, extends the former system by disclosing a facility for placing or initiating out-going telephone calls through the television receiver. In particular, the television receiver includes a hand-held remote control transmitter having a numerical key-pad operative in a television mode for effecting channel selection. However, in a telephone mode, the same numerical key-pad is operative for effecting a telephone dialing operation for placing an out-going telephone call through the television receiver.

In the telephone mode, each depression of a key of the numerical key-pad corresponds to the selection of a digit of the selected telephone number and results in a unique multibit code being coupled from the hand-held remote control transmitter to the television receiver. The transmitted multibit codes are decoded by a microprocessor incorporated within the television receiver which generates a corresponding output dialing signal consisting of a plurality of 60 millisecond duration logically high pulses separated by a plurality of logically low 40 millisecond inter-pulse intervals, each transmitted multibit code resulting in the generation of a dialing signal comprising a different number of pulses. Each logically low inter-pulse interval renders a switching transistor of a telephone interface circuit conductive for energizing a relay which, in turn, controls an ON/OFF HOOK switch, the condition of the ON/OFF HOOK switch being monitored by the external telephone network for completing the out-going telephone call.

The switching transistor operating the ON/OFF HOOK switch relay is D.C. biased from a regulated television receiver power supply deriving its input from the horizontal deflection system of the television receiver. The regulated D.C. power supply, as well as the receiver horizontal deflection system, additionally supplies operating voltages to various other parts of the television receiver such as the vertical deflection system. It has been found that, during a dialing-out operation, the load on the television receiver power supply is varied in a pulsating manner by the current pulses drawn through the ON/OFF HOOK switch relay, which load variations are reflected throughout the television receiver in the form of operating voltage variations. These operating voltage variations are particularly noticeable in the vertical deflection system of the television receiver where they cause the display image or picture produced on the viewing screen of the receiver to vertically bounce or jitter at the rate of the dialing signal. This effect is quite annoying and detracts from the overall desirability of the television receiver dialing-out function.

It is therefore a basic object of the present invention to provide an improved circuit for facilitating the placing of out-going telephone calls through a television receiver.

It is a more specific object of the invention to provide a circuit for eliminating picture bounce or jitter when dialing a selected telephone number through a television receiver.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings in which like reference numerals identify like elements in the several figures and in which:

DESCRIPTION OF THE PREFERRED EMBODIMENT

Figure 1:
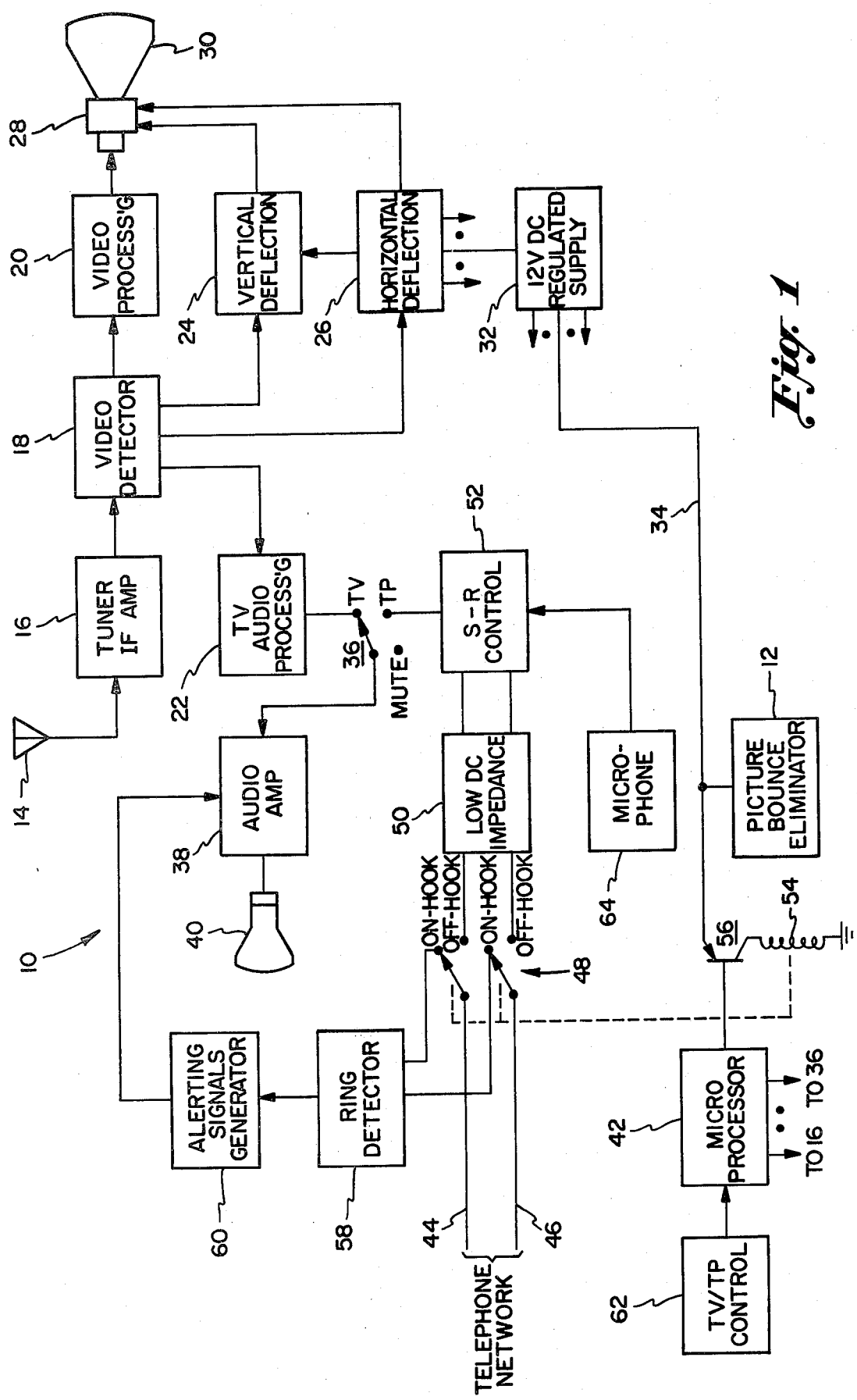
FIG. 1 is a generalized block diagram of a microprocessor-controlled television/telephone system including a picture bounce elimination circuit in accordance with the present invention.

Referring now to the drawings and, in particular, to FIG. 1, there is shown in block diagram form a microprocessor-controlled television/telephone system 10 including a picture bounce elimination circuit 12 according to the present invention. The system comprises, in one aspect, all of the components of a conventional television receiver. Thus, an antenna 14, or other source of RF television signals, is coupled to a tuner and IF amplifier stage 16 for converting a television signal transmitted over a selected television channel to a corresponding frequency-translated intermediate frequency signal. The intermediate frequency signal is converted to a corresponding baseband television signal by a video detector 18 whose output supplies a video processing circuit 20 as well as a TV audio processing circuit 22. The output of video detector 18 additionally supplies a vertical deflection circuit 24 and a horizontal deflection circuit 26, the outputs of deflection circuits 24 and 26 driving a yoke assembly 28 which cooperates with the output of video processing circuit 20 for producing a video display image on the viewing screen of a cathode ray tube 30.

Horizontal deflection circuit 26, in a manner well known in the art, additionally provides a plurality of output operating voltages which are supplied to different sections of the television receiver such as to vertical deflection circuit 24. An output of horizontal deflection circuit 26 is also supplied to a 12 volt DC regulated power supply 32 for supplying 12 volt DC regulated supply potentials used throughout the television receiver. As will be explained in further detail hereinafter, one output of the 12 volt regulated supply 32 is coupled as a biasing signal over a conductor 34 to a telephone interface circuit incorporated within the television receiver.

Television audio processing circuit 22 is connected through a function control switch 36 to the input of an audio amplifier 38 and therefrom to an acoustical speaker 40. Function control switch 36 is characterized by three positions; namely, a TV (television) position, a TP (telephone) position and a MUTE position. Function control switch 36 is operable for assuming any of its identified positions in response to the output of a microprocessor 42, microprocessor 42 also controlling selected functions of the television receiver, e.g., the tuning function, as well as various functions of the telephone interface circuitry as will be described in more detail hereinafter. In the mode of operation defined by the TV position of function control switch 36, the television receiver is operable for reproducing the audio component of the received television signal in a normal manner. In the TP position of function control switch 36, the telephone interface circuitry is enabled for conducting a two-way telephone conversation through the television receiver audio amplifier 38 and speaker 40 while, in the MUTE position of function control switch 36 all output audio is effectively muted.

The telephone interface circuitry couples an external telephone network to the television receivery by means of a pair of conductors 44 and 46. Conductors 44 and 46 are connected through an ON/OFF HOOK switch 48 and a low DC impedance network 50 to a conventional half-duplex send/receive control circuit 52. ON/OFF HOOK switch 48 is controlled by a relay 54 connected in the collector circuit of a switching transistor 56, the emitter of transistor 56 being connected to the 12 volt regulated supply 32 via conductor 34 and the base of transistor 56 being connected to an output of microprocessor 42. In its ON-HOOK position, switch 48 is connected through a ring detector 58 and an alerting signal generator 60 to an input of audio amplifier 38.

Microprocessor 42 is controlled by a television/telephone control unit 62. Control unit 62 may comprise, for example, a remote control transmitter together with a corresponding remote control receiver integrated within the television receiver. The remote control transmitter may include a number of controls for operating the television receiver as well as the telephone interface circuitry. In particular, the control unit 62 includes a numerical key-pad serving the dual purpose of channel selection in the television mode and telephone dialing in the telephone mode.

As shown in FIG. 1, the system 10 is in the television mode of operation enabling the television viewer to watch and listen to a received television program in a normal fashion. An incoming telephone call is coupled through ON/OFF HOOK switch 48 to ring detector 58 which causes alerting signals generator 60 to couple a ringer signal through audio amplifier 38 for sounding through speaker 40. Upon hearing the ringer signal, the viewer may activate a control on TV/TP control 62 causing microprocessor 42 to apply a logically low signal to the base of switching transistor 56 causing current to be drawn from supply 32 for energizing relay 54 and placing ON/OFF HOOK switch 48 in its OFF-HOOK position for answering the incoming call. At the same time, microprocessor 42 operates function control switch 36 for assuming the TP position. The telephone network now senses the low impedance presented by network 50 and completes the telephone connection. The incoming telephone call may be heard through the circuit consisting of ON/OFF HOOK switch 48, low impedance network 50, send/receive control 52, function control switch 36, audio amplifier 38 and speaker 40. On the other hand, the television receiver viewer may communicate to the caller through the circuit comprising a microphone 64, send/receive control 52, low impedance network 50 and the ON/OFF HOOK switch 48. After completing the telephone conversation, system 10 may be returned to the TV mode by de-energizing relay 54 causing ON/OFF HOOK switch 48 to resume its ON-HOOK position and by causing switch 36 to re-establish its TV position.

As mentioned previously, the numerical key-pad associated with control unit 62 may be used to dial an out-going telephone call. In this mode, each key depression of the numerical key-pad corresponds to a digit of the selected telephone number and causes a microprocessor 42 to couple a corresponding dialing signal to the base of switching transistor 56. The dialing signal comprises a plurality of 60 millisecond duration logically high pulses separated by logically low 40 millisecond inter-pulse intervals, each selected telephone digit resulting in the generation of a dialing signal comprising a different number of pulses. Each logically low inter-pulse interval renders switching transistor 56 conductive for energizing relay 54 which, in turn, momentarily places switch 48 in its OFF-HOOK position. As a result, each dialed digit of the telephone number causes switch 48 to successively assume its OFF-HOOK position a certain number of times. The foregoing operation of ON/OFF HOOK switch 48 is detected by the telephone network which thereby completes the placed telephone call.

In connection with the foregoing, it will be appreciated that the load presented to the power supply 32 varies in a pulsating manner as current is drawn through switching transistor 56 to energize relay 54 in response to the pulsating dialing signal coupled by microprocessor 42 to the base of switching transistor 56. These pulsating load variations are reflected throughout the entire television receiver in the form of corresponding operating voltage variations, which voltage variations are particularly noticeable in the vertical deflection system of the television receiver where they cause the display image or picture produced on the viewing screen of CRT 30 to vertically bounce or jitter at the rate of the dialing signal. In accordance with the present invention, the picture bounce elimination circuit 12 is provided for causing a substantially constant level of current to be drawn from power supply 32 during a dialing operation so as to eliminate or greatly minimize the foregoing picture bounce. In particular, picture bounce during the dialing out mode of operation of system 10 is largely eliminated by providing a second switching transistor 70 connected in parallel and in alternate conducting relationship with relay switching transistor 56 whereby a substantially constant level of current is drawn from power supply 32.

Figure 2:
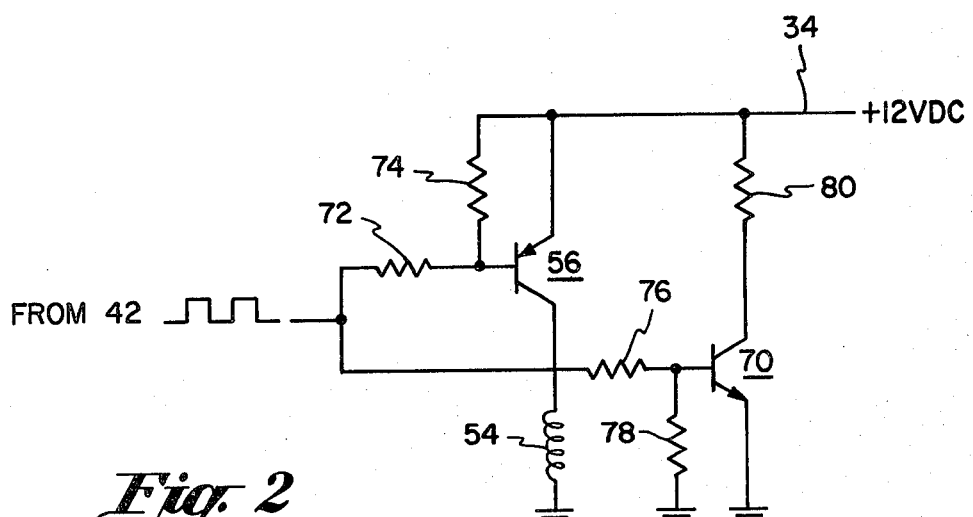
FIG. 2 is an electrical schematic diagram illustrating one embodiment of the picture bounce elimination circuit shown generally in FIG. 1.

FIG. 2 illustrates a first embodiment of picture bounce elimination circuit 12. The dialing signal output of microprocessor 42 is coupled through a resistor 72 to the base of relay switching transistor 56. The 12 volt DC supply is coupled to the emitter of transistor 56 and through a resistor 74 to the base of the transistor. The dialing signal output developed by microprocessor 42 is also coupled to the base of second transistor 70 through a pair of resistors 76 and 78, transistor 70 being of opposite conductivity type in relation to transistor 56. The collector of transistor 70 is coupled through a resistor 80 to conductor 34, resistor 80 being selected for presenting an impedance approximately equal to the impedance of relay 54.

In operation, whenever the dialing signal provided by microprocessor 42 is logically low, transistor 56 will be rendered conductive while transistor 70 will be cut-off. As a result, a predetermined current, 100 milliamperes for example, will be drawn from the power supply 32 through the emitter-collector circuit of transistor 56 for energizing relay 54 while no current is drawn through transistor 70. On the other hand, when the dialing signal is logically high, transistor 56 is cut off while transistor 70 is rendered conductive. As a result, 100 milliamperes of current is now drawn from power supply 32 through resistor 80 and the collector-emitter circuit of transistor 70 while no current is drawn through transistor 56. Therefore, throughout the dialing operation, a substantially constant level of current is drawn from power supply 32 largely eliminating any picture bounce in the display produced on the viewing screen of CRT 30.

In the circuit of FIG. 2, the input signal levels provided by microprocessor 42 must be sufficient for confidently turning transistors 56 and 70 on and off in the desired manner. Unfortunately, such signal levels cannot always be guaranteed and, in particular, it cannot always be safely assumed that the logically high level of the dialing signal will be sufficient to properly operate the transistors. To partially eliviate this problem, in the circuit of FIG. 3 the base of second transistor 70 is connected to the collector of relay switching transistor 56 instead of directly to the output of microprocessor 42. In addition, second transistor 70 is of like conductivity in relation to transistor 56 with its emitter connected to conductor 34 and its collector connected through resistor 80 to ground. Thus, when the input dialing signal is logically low the transistor 56 is rendered conductive drawing approximately 100 milliamperes of current through relay 54 and also placing a 12 volt bias on the base of transistor 70 to ensure that the transistor remains cut-off. When the input dialing signal goes logically high, transistor 56 is cut-off and the base of transistor 70 is effectively grounded rendering this transistor conductive. Conducting transistor 70 now draws 100 milliamperes of current to maintain a uniform load on the 12 volt supply 32 in order to prevent vertical picture bounce.

Figure 3:
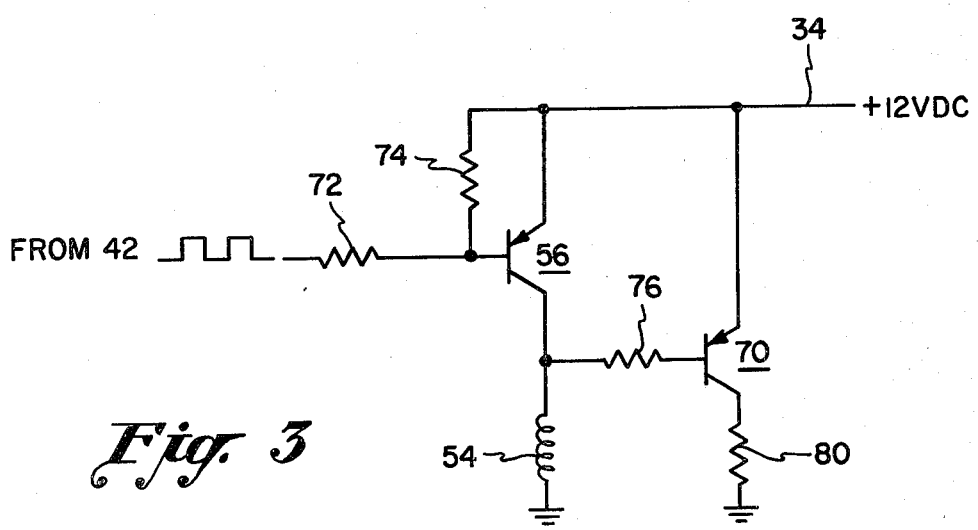
FIG. 3 is an electrical schematic diagram illustrating another embodiment of the picture bounce elimination circuit shown generally in FIG. 1.

A disadvantage of both of the circuits of FIGS. 2 and 3 is that one of the transistors 56 or 70 is always conducting even when the system is not being operated in a dialing mode. That is, during the normal television mode of operation when the input signal to the base of transistor 56 is logically high de-energizing relay 54, transistor 70 will be conducting in each case. Due to heat dissipation and other well known factors, this will result in a relatively low life expectancy of the continuously conducting transistors. This problem is overcome by the circuit of FIG. 4 wherein the transistors 56 and 70 are active only during the dialing mode of operation. That is, no current is drawn through either transistor 56 or 70 except during a dialing out mode of operation when the 100 milliamperes of current drawn from the power supply is alternately conducted by the transistors.

Figure 4:
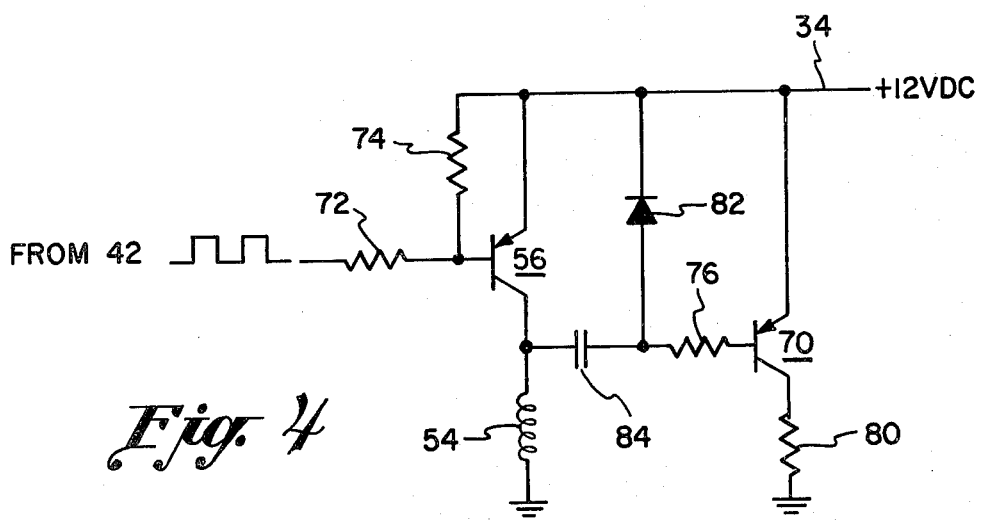
FIG. 4 is an electrical schematic diagram illustrating yet another embodiment of the picture bounce elimination circuit shown generally in FIG. 1.

Referring to FIG. 4, the illustrated circuit is largely similar to the circuit of FIG. 3 except that the collector of transistor 56 is coupled by a capacitor 84 and a diode 82 to conductor 34. When power is first applied to this circuit, capacitor 84 will charge to the 12 volt supply voltage through the emitter-base circuit of transistor 70 and relay 54. Thereafter, and while in the normal television mode, transistor 70 will be held non-conductive by the 12 volt charge on capacitor 84 while transistor 56 will be held non-conductive by the logically high input signal supplied by microprocessor 42. Thus, as long as the system is maintained in the normal television mode of operation, both transistors 56 and 70 will be held non-conductive.

When ON/OFF HOOK switch 48 is to be placed in its OFF-HOOK position, either to receive an incoming telephone call or to place an outgoing telephone call, the input signal supplied to the base of transistor 56 from microprocessor 42 goes logically low whereby transistor 56 is rendered conductive placing the plate of capacitor 84 connected to relay 54 at supply potential such that the voltage at the other plate of the capacitor rapidly increases. Diode 82 is thereby rendered conductive and capacitor 84 discharges therethrough until both of the plates of capacitor 84 are at 12 volts, i.e. a zero differential voltage across the capacitor. Thereafter, as long as the dialing signal remains logically low, transistor 56 will continue to draw 100 milliamperes of current from the power supply 32 for energizing relay 54 while transistor 70 will remain cut-off.

When the input dialing signal first goes logically high, transistor 56 is immediately turned off effectively grounding the plate of capacitor 86 connected to relay 54. As a result, the voltage at the other plate of capacitor 84 rapidly decreases turning transistor 70 on for drawing the current from the power supply 32. The values of resistor 76 and capacitor 84 are selected such that the base current flowing in conducting transistor 70 charges capacitor 84 at a relatively slow rate and also maintains transistor 70 in a saturated condition. Therefore, at the conclusion of the interval during which the dialing signal is logically high capacitor 84 will have charged to only about 2-3 volts such that transistor 70 will have been maintained uniformly conductive throughout the entire logically high interval. During the following low level interval of the input dialing signal, transistor 56 is again rendered conductive for drawing the current from power supply 32 through relay 54. The previously grounded plate of capacitor 84 is thereby again raised to supply potential whereby the voltage on the other plate of capacitor 84 quickly rises rendering transistor 70 non-conductive and discharging capacitor 84 through diode 82. During the next logically high level interval of the input dialing signal transistor 56 is again rendered non-conductive while transistor 70 is turned on for conducting the current drawn from power supply 32 as previously described. The foregoing cycle continues for each interval of the input dialing signal whereby the two switching transistors 56 and 70 are alternately rendered conductive for drawing a uniform level of current from power supply 32. As a consequence, during the dialing out mode of operation a uniform current is drawn from the power supply minimizing any picture bounce or jitter produced on the viewing screen of CRT 30.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a communications system including a television receiver having video display means for producing a video display image in accordance with a received television signal and a telephone interface circuit integrated with said television receiver and cooperable with an external telephone network for processing a dialing signal so as to complete a telephone connection with the corresponding telephone number, the improvement comprising means cooperating with said telephone interface circuit for inhibiting the production of perturbations in said video display image which would otherwise be caused by the processing of said dialing signal for completing said telephone connection.

2. In a communications system including a television receiver having video display means for producing a video display image in accordance with a received television signal, a telephone interface circuit cooperable with an external telephone network for processing a dialing signal so as to complete a telephone connection with the corresponding telephone number and power supply means coupled to both said television receiver and telephone interface circuit, said telephone interface circuit presenting a variable load to said power supply means in response to said dialing signal so as to perturbate the video display image produced by said video display means, the improvement comprising means cooperating with said telephone interface circuit for presenting a substantially uniform load to said power supply means in response to said dialing signal so as to inhibit the perturbation of said video display image.

3. In a television receiver including video display means for producing a video display image in accordance with a received television signal and power supply means responsive to an irregular load for perturbating the video display image produced by said video display means, the improvement comprising:
   viewer operable means for developing a dialing signal representing a selected telephone number;
   a telephone interface circuit coupled to said power supply means and responsive to said dialing signal for completing a telephone connection with said selected telephone number through an external telephone network in a manner so as to present an irregular load to said power supply means; and
   means cooperating with said telephone interface circuit for effecting the presentation thereby of a substantially uniform load to said power supply means in response to said dialing signal.

4. In a television receiver including video display means for producing a video display image in accordance with a received television signal and power supply means responsive to an irregular current drain for perturbating the video display image produced by said video display means, the improvement comprising:
   viewer operable means for developing a dialing signal representing a selected telephone number;
   a telephone interface circuit coupled to said power supply means and responsive to said dialing signal for completing a telephone connection with said selected telephone number through an external telephone network in a manner so as to cause an irregular current drain from said power supply means; and
   means cooperating with said telephone interface circuit for effecting a substantially uniform current drain from said power supply means in response to said dialing signal.

5. The improvement according to claim 4 wherein said viewer operable means comprises means for developing a dialing signal comprising an alternating succession of logically high and logically low intervals, said telephone interface circuit comprising means for establishing a predetermined current drain from said power supply means during each of one of said logically high and logically low intervals and said means cooperating with said telephone interface circuit establishing said predetermined current drain from said power supply means during each of the other of said logically high and logically low intervals.

6. The improvement according to claim 5 wherein said telephone interface circuit comprises a first transistor and a relay, the base of said first transistor being coupled for receiving said dialing signal and the emitter-collector circuit of said first transistor being connected to said power supply means and in series with said relay, said means cooperating with said telephone interface circuit comprising a second transistor of opposite conductivity type with respect to said first transistor and circuit impedance means, the base of said second transistor being coupled for receiving said dialing signal and the emitter-collector of said second transistor being connected to said power supply means and in series with said impedance means.

7. The improvement according to claim 6 wherein the impedance characterizing said impedance means is approximately equal to the impedance characterizing said relay.

8. The improvement according to claim 5 wherein said telephone interface circuit comprises a first transistor and a grounded relay, the base of said first transistor being coupled for receiving said dialing signal and the emitter-collector circuit of said first transistor being connected between said power supply means and the ungrounded end of said relay, said means cooperating with said telephone interface circuit comprising a second transistor of like conductivity type with respect to said first transistor and circuit impedance means, the base of said second transistor being coupled to the ungrounded end of said relay and the emitter-collector circuit of said second transistor being connected to said power supply means and in series with said impedance means.

9. The improvement according to claim 8 wherein the impedance characterizing said impedance means is approximately equal to the impedance characterizing said relay.

10. The improvement according to claim 8 including means coupled between the ungrounded end of said relay and the base of said second transistor for inhibiting conduction of said second transistor except in response to the application of said alternating dialing signal to the base of said first transistor.

* * * * *